United States Patent
Hsu et al.

(10) Patent No.: US 6,567,894 B1
(45) Date of Patent: May 20, 2003

(54) METHOD AND APPARATUS TO PREFETCH SEQUENTIAL PAGES IN A MULTI-STREAM ENVIRONMENT

(75) Inventors: Windsor Wee Sun Hsu, Sunnyvale, CA (US); Honesty Cheng Young, Saratoga, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/456,539

(22) Filed: Dec. 8, 1999

(51) Int. Cl.$^7$ ............................................... G06F 12/00
(52) U.S. Cl. ..................................................... 711/137
(58) Field of Search ..................... 365/189.01, 230.01; 709/231; 711/137; 712/205, 206, 207

(56) References Cited

U.S. PATENT DOCUMENTS

| | | | |
|---|---|---|---|
| 4,926,323 A | | 5/1990 | Baror et al. |
| 5,381,539 A | | 1/1995 | Yanai et al. |
| 5,537,574 A | | 7/1996 | Elko et al. |
| 5,623,608 A | | 4/1997 | Ng |
| 5,664,147 A | * | 9/1997 | Mayfield .................... 711/137 |
| 5,706,467 A | | 1/1998 | Vishlitzky et al. |
| 5,740,399 A | * | 4/1998 | Mayfield et al. ............. 711/137 |
| 5,761,706 A | * | 6/1998 | Kessler et al. .............. 711/118 |
| 5,787,473 A | | 7/1998 | Vishlitzky et al. |
| 5,802,566 A | | 9/1998 | Hagersten |
| 5,954,801 A | * | 9/1999 | Sokolov ........................ 710/5 |
| 6,085,291 A | * | 7/2000 | Hicks et al. ................. 711/137 |
| 6,092,149 A | * | 7/2000 | Hicken et al. ............... 711/113 |

* cited by examiner

*Primary Examiner*—Do Hyun Yoo
*Assistant Examiner*—Christian P. Chace
(74) *Attorney, Agent, or Firm*—Morgan & Finnegan LLP; Khanh Q. Tran (57) ABSTRACT

The present invention is system and method for determining information that is to be prefetched in a multi-stream environment which can detect sequential streams from among the aggregate reference stream and yet requires relatively little memory to operate, which is uniquely adapted for use in a multi-stream environment, in which multiple data accessing streams are performing sequential accesses to information independently of each other. A reference address referencing stored information is received. A matching run is found. A count corresponding to the run is updated. If the count exceeds a predetermined threshold, an amount of information to prefetch is determined. If a predetermined fraction of the determined amount of information to prefetch must still be retrieved, the determined amount of information is retrieved. A matching run may be found by searching a stack comprising a plurality of entries to find an entry corresponding to the reference address. Each of the plurality of entries may be associated with a maximum accessed address, a forward range, and a backward range, and the searching step may comprise searching the plurality of stack entries in one direction starting at an end of the stack and determining whether the reference address is between (maximum accessed address−backward range) and (maximum accessed address+forward range) for each stack entry until a matching stack entry is found.

30 Claims, 6 Drawing Sheets

METHOD AND APPARATUS TO PREFETCH SEQUENTIAL PAGES IN A MULTI-STREAM ENVIRONMENT

FIELD OF THE INVENTION

The present invention relates to a method and apparatus for determining information that is to be prefetched in a multi-stream environment

BACKGROUND OF THE INVENTION

Modern storage adapters and controllers typically have some cache memory to capture temporal locality, which is the property that if a page is referenced recently, it is likely to be referenced again in the near future. However, certain data streams also exhibit spatial locality. That is, when a page is referenced, the next few pages are likely to be referenced soon. Sequential prefetch is a well-known mechanism to capture spatial locality, which has been done in single-stream environments such as file system and database software systems. A single-stream environment is an environment in which logical information is available to identify potential sequential streams of reference. For example, in a file system, the references to a file are likely to be sequential in nature.

Problems arise when implementing prefetch in a multi-stream storage environment. In a multi-stream environment, each stream is independently referencing storage locations, resulting in a reference stream presented to the storage device that is an aggregate of the individual streams. The aggregate stream will likely not possess significant spatial locality, even though each individual stream may. A further problem arises in that the prefetch scheme cannot use too much memory, because some storage adapters have limited memory.

A need arises for a technique which can detect sequential streams from among the aggregate reference stream and yet requires relatively little memory to operate.

SUMMARY OF THE INVENTION

The present invention is a system and method for determining information that is to be prefetched in a multi-stream environment which can detect sequential streams from among the aggregate reference stream and yet requires relatively little memory to operate. It is uniquely adapted for use in a multi-stream environment, in which multiple data accessing streams are performing sequential accesses to information independently of each other. The present invention detects patterns of sequential accesses from among the jumble of accesses that the aggregate access stream presents to the storage system.

In accordance with the method of the present invention, a reference address referencing stored information is received. A matching run is found. A count corresponding to the run is updated. If the count exceeds a predetermined threshold, an amount of information to prefetch is determined. If a predetermined fraction of the determined amount of information to prefetch must still be retrieved, the determined amount of information is retrieved. A matching run may be found by searching a stack comprising a plurality of entries to find an entry corresponding to the reference address. Each of the plurality of entries may be associated with a maximum accessed address, a forward range, and a backward range, and the searching step may comprise searching the plurality of stack entries in one direction starting at an end of the stack and determining whether the reference address is between (maximum accessed address−backward range) and (maximum accessed address+forward range) for each stack entry until a matching stack entry is found.

The method may further comprise rearranging the plurality of stack entries according to a replacement policy. The replacement policy may be a first-in, first-out replacement policy. Alternatively, other replacement schemes may be used. The plurality of stack entries may further be rearranged so as to make the referenced information eligible for immediate replacement.

An amount of information to prefetch may be determined based on the count corresponding to the run and on a size of the prefetch buffer. The count may be updated for each reference address matching the run or for each unique reference address matching the run.

BRIEF DESCRIPTION OF THE DRAWINGS

The details of the present invention, both as to its structure and operation, can best be understood by referring to the accompanying drawings, in which like reference numbers and designations refer to like elements.

DETAILED DESCRIPTION OF THE INVENTION

The present invention is system and method for determining information that is to be prefetched in a multi-stream environment which can detect sequential streams from among the aggregate reference stream and yet requires relatively little memory to operate. It is uniquely adapted for use in a multi-stream environment, in which multiple data accessing streams are performing sequential accesses to information independently of each other. The present invention detects patterns of sequential accesses from among the jumble of accesses that the aggregate access stream presents to the storage system.

Figure 1:
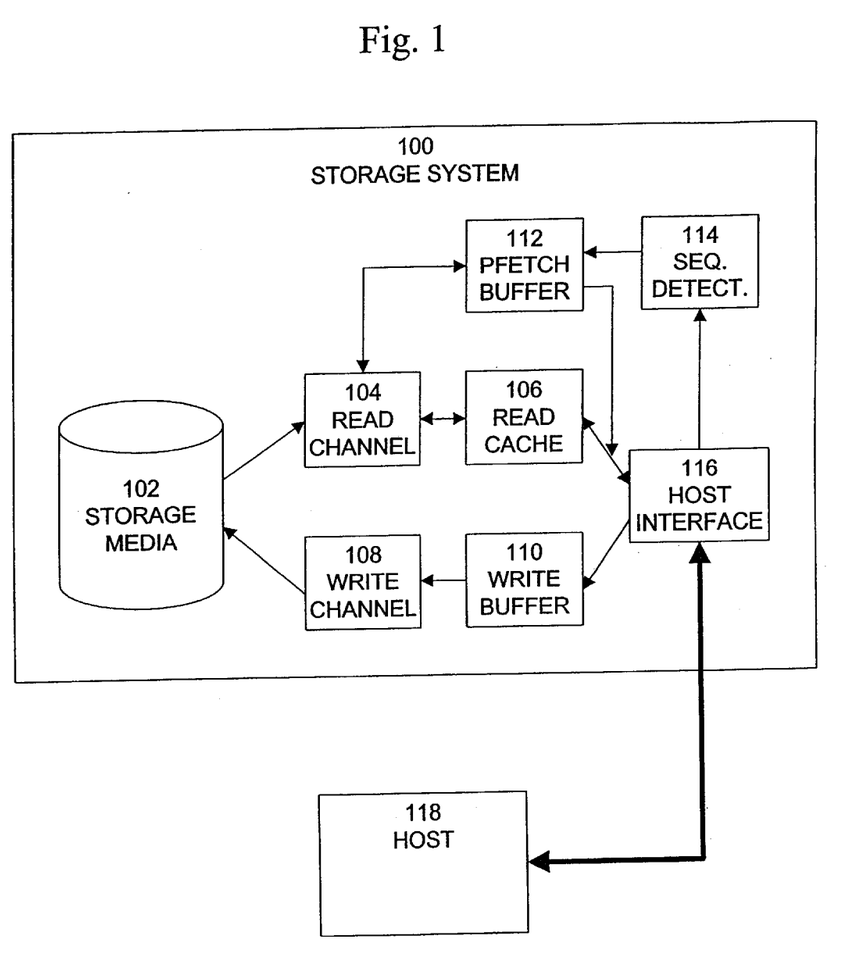
FIG. 1 is an exemplary block diagram of a storage system, according to the present invention.

An exemplary block diagram of a storage system 100, according to the present invention, is shown in FIG. 1. System 100 includes storage media 102, read channel 104, read cache 106, write channel 108, write buffer 110, prefetch buffer 112, sequential detector 114 and host interface 116. Storage media 102 stores information and may output signals representing that information. Storage media 102 is typically a magnetic medium, such as hard or floppy disk or tape, or may be another type of medium. For example, storage media 102 may be an optical medium, such as optical disk or holographic storage, or an electronic medium such as random-access memory (RAM), read-only memory (ROM), etc. Read channel 104 is circuitry that converts the signal from storage media 104 into digital data signals representing information. Read cache 106 is memory, typically electronic memory, which temporarily stores information that has been read from storage media 102 before the information is transmitted to host system 118 via host interface 116. Host interface 116 interfaces with host system 118 in order to transmit information read from storage media 102 to host system 118 and to receive information from host system 118 for writing to storage media 102. Write buffer 110 is memory, typically electronic memory, which temporarily stores information that has been received from host system 118 via host interface 116 before the information is written to storage media 102. Write channel 108 is circuitry that converts the digital data signal representing information stored in write buffer 110 to signals used by storage media 102 to store information. Prefetch buffer 112 is memory, typically electronic memory, which stores the information that has been prefetched from storage media 102. Sequential detector 114 determines when sequential prefetch is to be started, when sequential prefetch is to be stopped, the amount of information to prefetch and the information that is to be kept in prefetch buffer 112.

Figure 2:
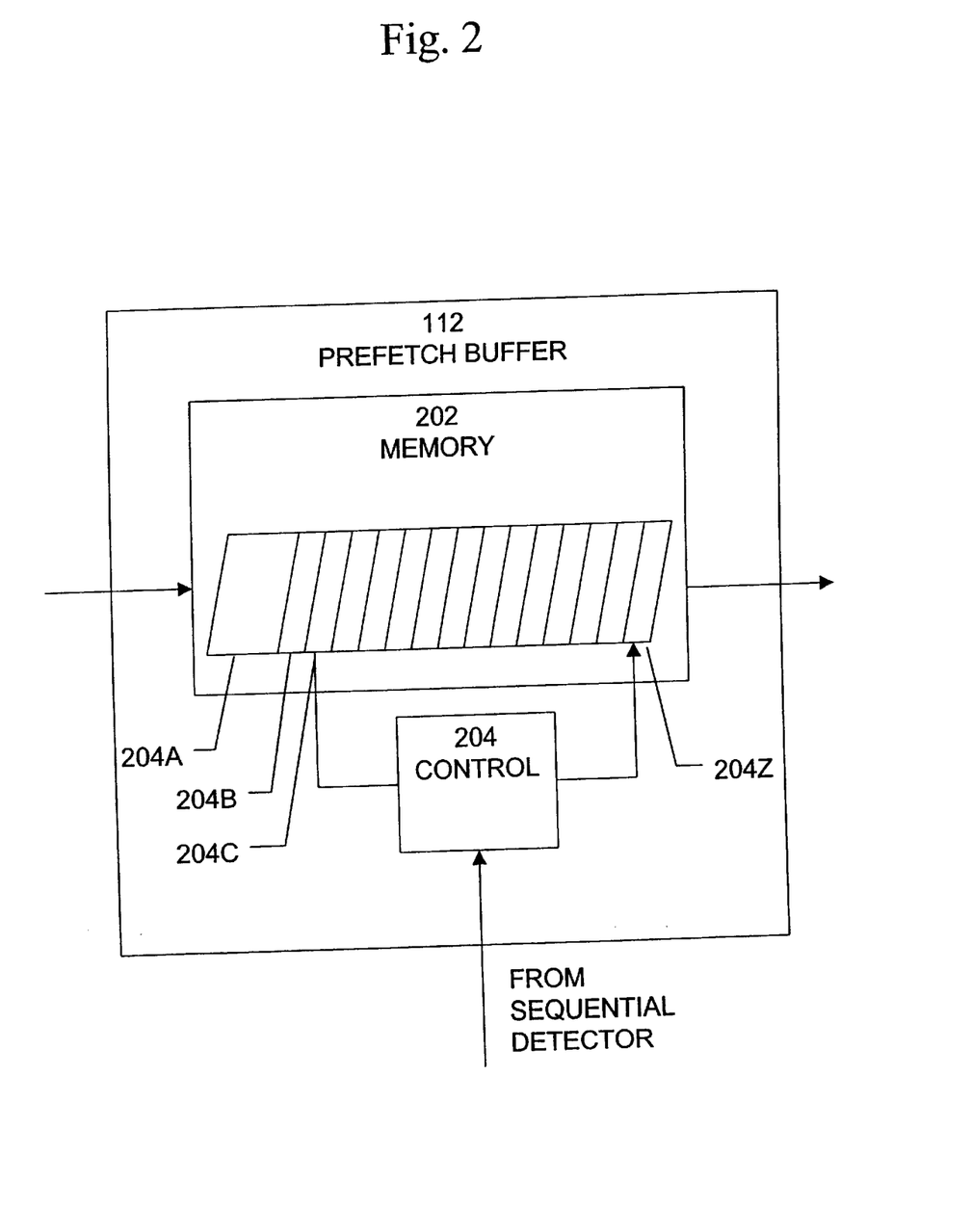
FIG. 2 is a more detailed block diagram of a prefetch buffer shown in FIG. 1.

Prefetch buffer 112 is shown in more detail in FIG. 2. Prefetch buffer 112 includes a memory 202 and a control block 204. Memory 202 stores information read from storage media 102, while control block 204 controls the storage, output, and replacement of information in memory 202. Typically, information stored in memory 202 is organized in pages, with the unit of storage, output, or replacement being one page. FIG. 2 shows representative pages 204A, 204B, 204C and 204Z for the memory 202. Control block 204 controls the replacement of pages in memory 202 based on several parameters, including the memory size and its replacement policy. Control block 204 accepts control signals from sequential detector 114, which determines when information is to be prefetched and the amount of information to be prefetched.

In a preferred embodiment, the memory size and replacement policy are defined as follows: The size of memory 202 is 256 pages of 4 kilobytes each, which yields a memory size of 1 megabyte. The pages in memory 202 are replaced in a first-in, first-out (FIFO) replacement scheme, as controlled by control block 204. When a page is referenced, control block 204 places the page at the end of the FIFO, which makes the page eligible for replacement immediately. This arrangement is advantageous when the adapter memory size is smaller than host memory size.

Although, in FIGS. 1 and 2, prefetch buffer 112 is shown as separate from read cache 106, one of skill in the art would recognize that memory 202 may be implemented in combination with read cache 106. For clarity, the prefetch buffer is described separately from the read cache.

Figure 3:
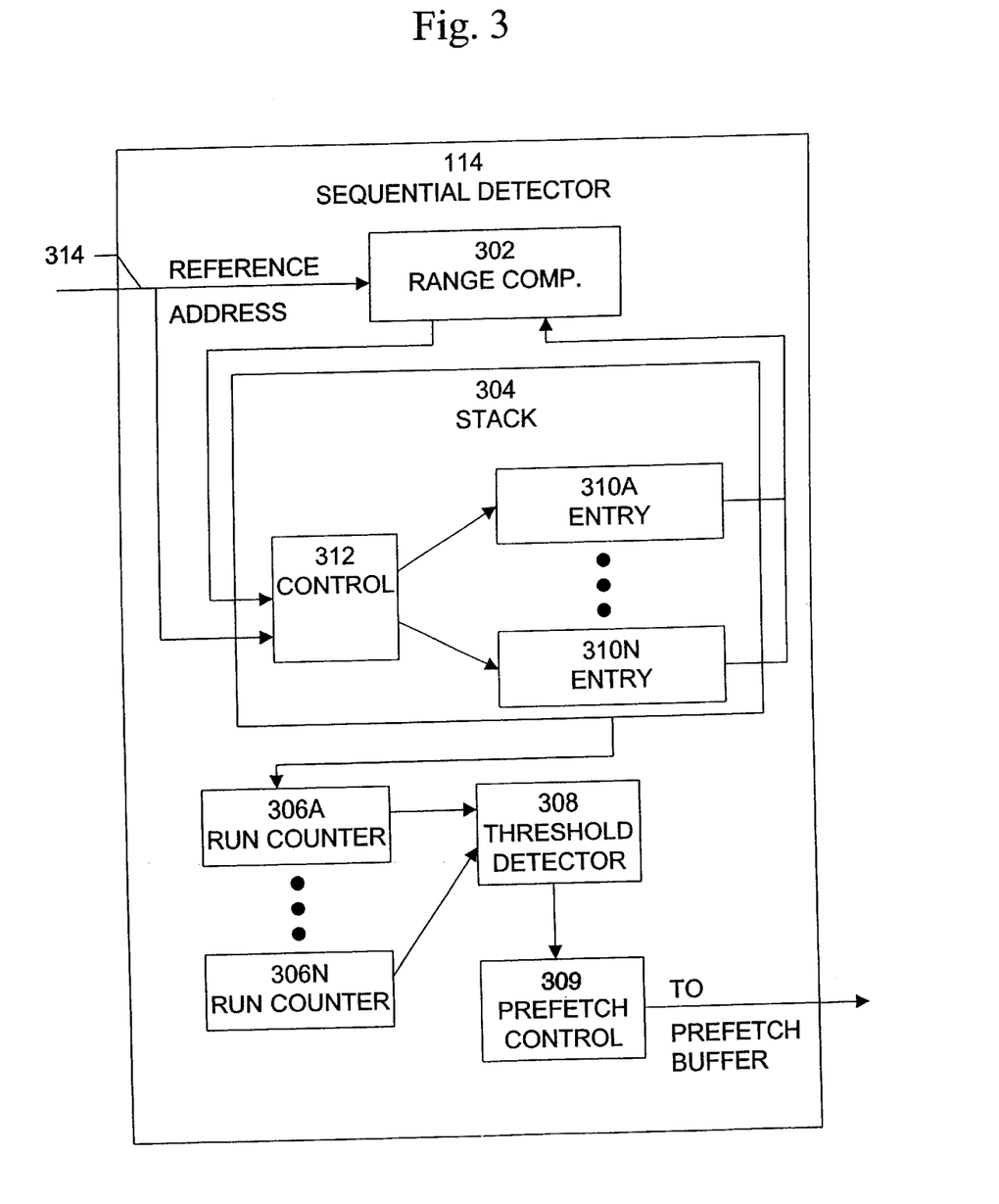
FIG. 3 is a more detailed block diagram of a sequential detector shown in FIG. 1.

Sequential detector 114 is shown in more detail in FIG. 3. Sequential detector 114 detects sequences of accesses that are termed "runs", which are used to group pages that are accessed. Sequential detector 114 includes a range comparator 302, a stack 304, run counters 306A–N, and threshold detector 308

Stack 304 includes a plurality of stack entries 310A–N and a control block 312. In a preferred embodiment, stack 304 includes 16 entries. When an address is referenced, the reference address is input to the stack control block 312, which searches down the stack to find the first matching run.

In order to find the matching run, range comparator 302 compares the input reference address 314 with parameters associated with each entry in stack 304. In a preferred embodiment, three parameters are considered: maximum accessed address, backward range, and forward range. If a reference address 314 falls between (maximum accessed address−backward range) and (maximum accessed address+forward range), address 314 belongs to the corresponding run. The backward and forward ranges are useful in order to capture access patterns that are not consecutively or strictly sequential. If the reference address is bigger than the maximum accessed address, the maximum accessed address associated with that run is updated accordingly.

Each run counter 306A–N is associated with an entry in stack 304. In a preferred embodiment, each counter is incremented each time an access that is part of the run corresponding to the associated stack entry occurs. In another embodiment, the counter is incremented each time a fresh or new page is accessed in the run. Threshold detector 308 detects when a counter has exceeded a predetermined threshold value, in which case, the run is determined to be a sequential run.

Figure 4:
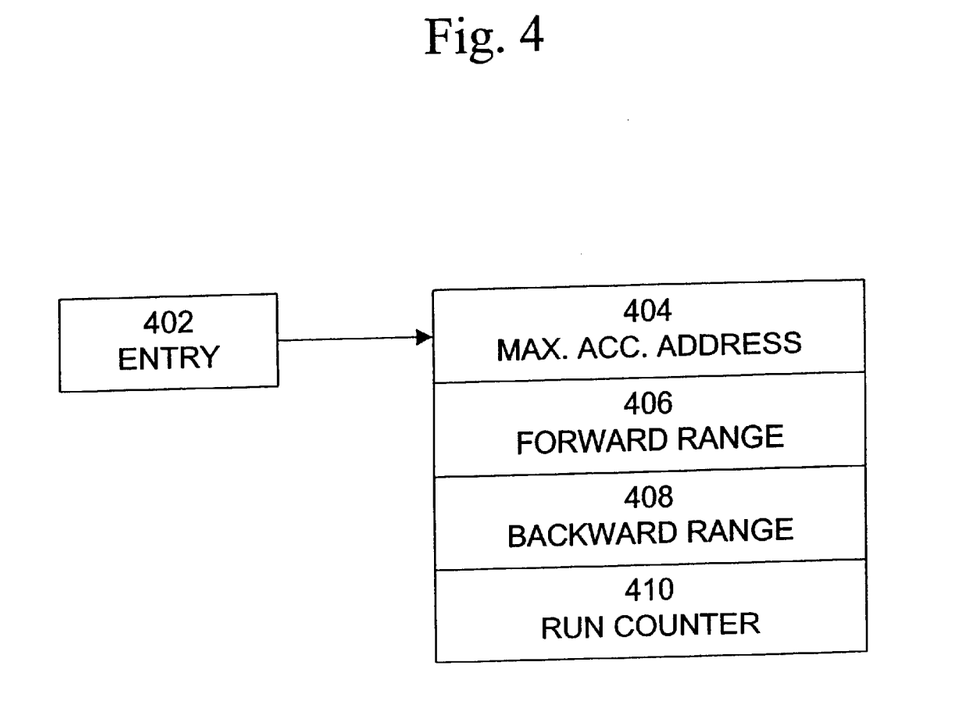
FIG. 4 is an example of information used by the sequential detector shown in FIG. 1.

An example of information used by sequential detector 114 is shown in FIG. 4. Each entry in stack 304, for example entry 402 of FIG. 4, has associated with it a maximum access address 404, a forward range 406, a backward range 408, and a run counter 410. Maximum accessed address 404 is the address of the page having the highest address that has been addressed in the run corresponding to stack entry 402. Forward range 406 and backward range 408 specify a range of addresses around maximum accessed address 404 which will be considered part of the run. Run counter 410 stores the number of accesses that have occurred to the corresponding run.

Figure 5:
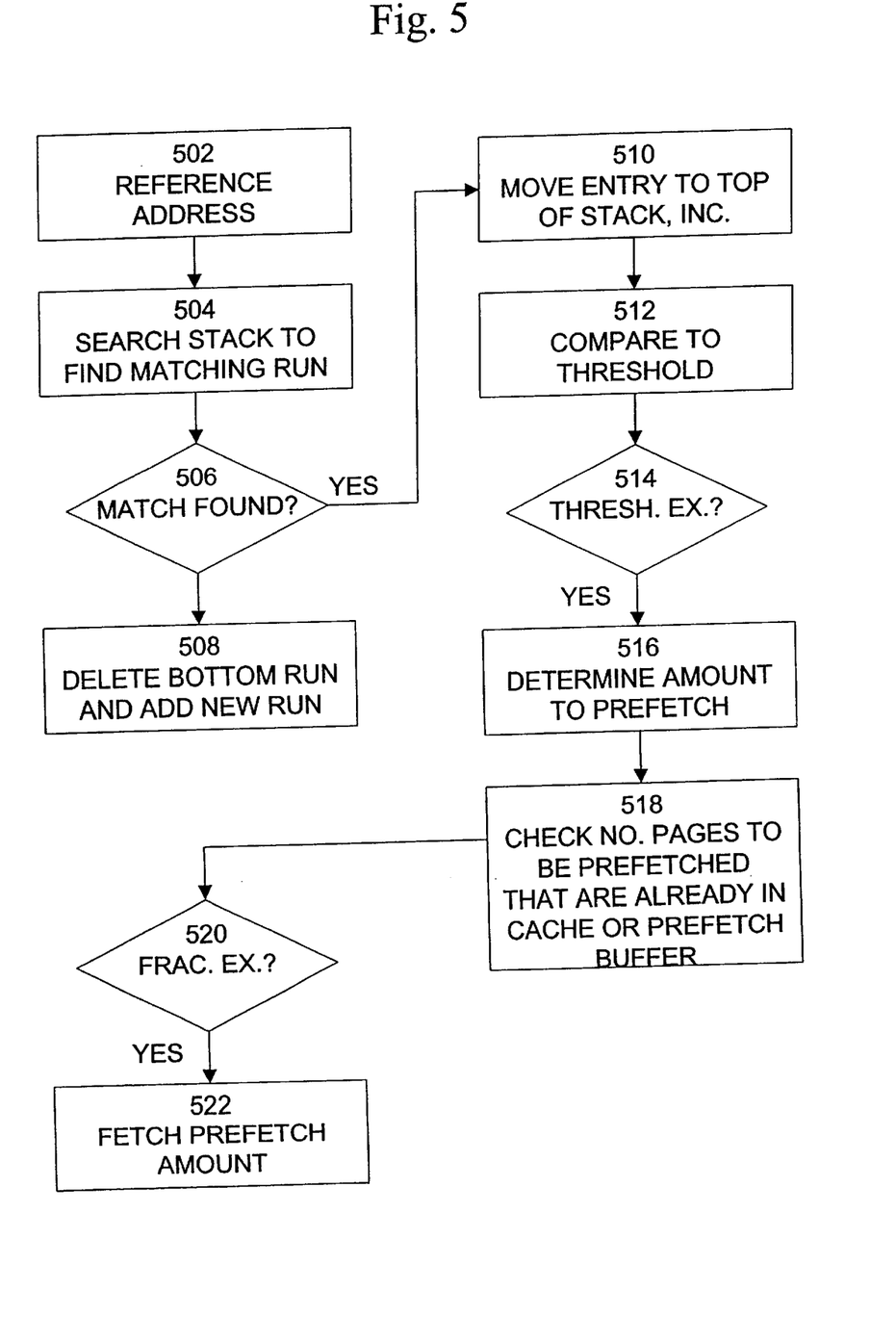
FIG. 5 is an exemplary flow diagram of the operation of the sequential detector shown in FIG. 1.

An exemplary flow diagram of the operation of sequential detector 114 is shown in FIG. 5. In step 502, a reference address is received as a result of stored information being referenced. In step 504, the stack is searched to find a matching run. In a preferred embodiment, the matching run is found by searching the stack entries downwards and determining whether the reference address falls between (maximum accessed address−backward range) and (maximum accessed address+forward range) for each stack entry until a matching entry is found. Thus, the first matching entry in the stack will be found. In step 506, it is determined whether a matching run is found. If not, then in step 508, the entry at the bottom of the stack, which corresponds to the run that has spent the longest time in the stack without being accessed of any in the stack, is deleted. A new stack entry, corresponding to a new run including the reference address is added to the top of the stack, where the top of the stack is the end that is searched first in step 504. Information relating to the run, such as maximum accessed address, forward range, and backward range are stored and the run counter is incremented.

If, in step 508, a matching run is found, then in step 510, the entry corresponding to the matching run is moved to the top of the stack and the corresponding run counter is incremented. Although in this preferred embodiment, a least-recently-used (LRU) replacement policy is used, as described, one of skill in the art would recognize that the present invention contemplates other replacement policies as well. In one embodiment of the present invention, a run counter is incremented each time a reference is made to an address in the run. In another embodiment of the present invention, a run counter is incremented each time a unique reference is made to an address in the run.

In step 512, the value stored in the run counter is compared with a predetermined threshold. In step 514, in is determined whether the value in the run counter exceeds the predetermined threshold. If so, the run is determined to be a sequential run and, in step 516, a prefetch amount is determined based on the run counter value, prefetch buffer size, and other system parameters. In step 518, the cache and prefetch buffer are checked to determine the number of pages, of those that are to be prefetched, that are already in the cache or prefetch buffer. Those pages that are already in the cache or prefetch buffer need not be prefetched again, as they are already available without accessing the storage media. Those pages that are not already in the cache or prefetch buffer do need to be prefetched. In step 520, a fraction is generated which represents the proportion of pages do need to be prefetched to the total amount that is to be prefetched. If the fraction that still must be prefetched exceeds a predetermined fraction, then in step 522 the determined prefetch amount is retrieved from the storage media and placed in the prefetch buffer, where it will be quickly available for access by the host system.

Figure 6:
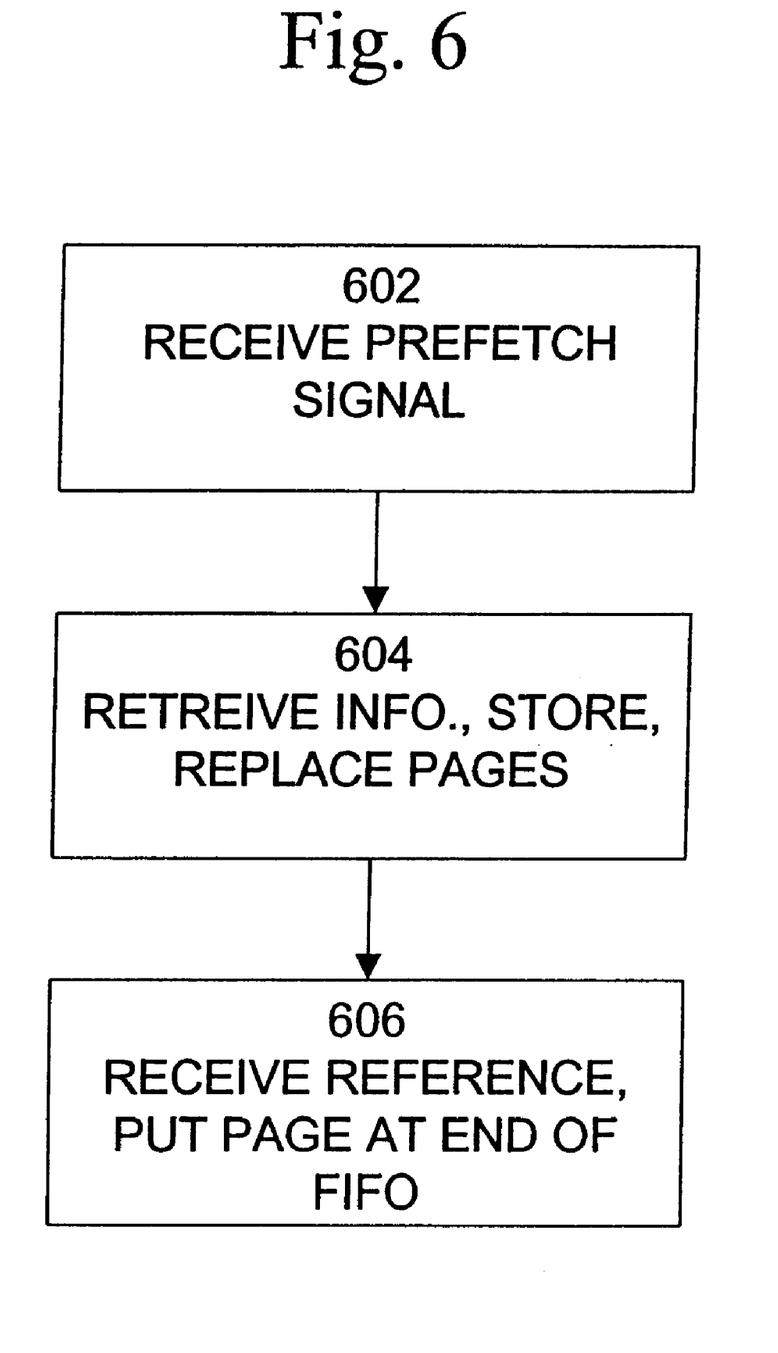
FIG. 6 is an exemplary flow diagram of the operation of the prefetch buffer shown in FIG. 1.

An exemplary flow diagram of the operation of prefetch buffer 112 is shown in FIG. 6. In step 602, the sequential detector transmits a signal to prefetch buffer control block 204 to prefetch a quantity of information. In step 604, control block 204 retrieves the information from the storage media and stores the information in memory 202, organized into pages. In addition, pages in memory 202 may be replaced based on a first-in, first-out (FIFO) replacement scheme. In step 606, a page in memory 202 is referenced and control block 204 places the page at the end of the FIFO, which makes the page eligible for replacement immediately. This arrangement is advantageous when the adapter memory size is smaller than host memory size.

One of ordinary skill in the art would recognize that the present invention may be implemented using a variety of techniques. For example, the present invention may be implemented using discrete or integrated electronic circuitry, state machines, programmed special-purpose processors, programmed general-purpose processors, software, firmware, and combinations of these and other techniques. Likewise it is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media such as floppy disc, a hard disk drive, RAM, and CD-ROM's, as well as transmission-type media, such as digital and analog communications links.

Although specific embodiments of the present invention have been described, it will be understood by those of skill in the art that there are other embodiments that are equivalent to the described embodiments. Accordingly, it is to be understood that the invention is not to be limited by the specific illustrated embodiments, but only by the scope of the appended claims.

What is claimed is:

1. A method for determining information that is to be prefetched in a multi-stream environment, comprising the steps of:
    receiving a reference address referencing stored information;
    finding a matching run;
    updating a count corresponding to the run;
    determining an amount of information to prefetch, if the count exceeds a predetermined threshold; and
    retrieving the determined amount of information, if a predetermined fraction of the determined amount of information to prefetch must still be retrieved.

2. The method of claim 1, wherein the step of finding a matching run comprises the step of:
    searching a stack comprising a plurality of entries to find an entry corresponding to the reference address.

3. The method of claim 2, wherein each of the plurality of entries is associated with a maximum accessed address, a forward range, and a backward range, and the searching step comprises the steps of:
    searching the plurality of stack entries in one direction starting at an end of the stack; and
    determining whether the reference address is between (maximum accessed address−backward range) and (maximum accessed address+forward range) for each stack entry until a matching stack entry is found.

4. The method of claim 3, further comprising the step of:
    rearranging the plurality of stack entries according to a replacement policy.

5. The method of claim 4, wherein the replacement policy is a least-recently used replacement policy.

6. The method of claim 5, further comprising the step of:
    storing the retrieved information in a prefetch buffer, the prefetch buffer organized using a first-in, first-out replacement policy.

7. The method of claim 6, wherein the rearranging policy makes the referenced information eligible for immediate replacement.

8. The method of claim 3, wherein the step of determining an amount of information to prefetch comprises the step of:
    determining an amount of information to prefetch based on the count corresponding to the run and on a size of the prefetch buffer.

9. The method of claim 3, wherein in the updating step comprises the step of:
    updating the count corresponding to a run for each reference address matching the run.

10. The method of claim 3, wherein in the updating step comprises the step of:
    updating the count corresponding to a run for each unique reference address matching the run.

11. A system for determining information that is to be prefetched in a multi-stream environment, comprising:
    means for receiving a reference address referencing stored information;
    means for finding a matching run;
    means for updating a count corresponding to the run;
    means for determining an amount of information to prefetch, if the count exceeds a predetermined threshold; and
    means for retrieving the determined amount of information, if a predetermined fraction of the determined amount of information to prefetch must still be retrieved.

12. The system of claim 11, wherein the means for finding a matching run comprises:
    means for searching a stack comprising a plurality of entries to find an entry corresponding to the reference address.

13. The system of claim 12, wherein each of the plurality of entries is associated with a maximum accessed address, a forward range, and a backward range, and the searching means comprises:
    means for searching the plurality of stack entries in one direction starting at an end of the stack; and
    means for determining whether the reference address is between (maximum accessed address−backward range)

and (maximum accessed address+forward range) for each stack entry until a matching stack entry is found.

14. The system of claim 13, further comprising:
means for rearranging the plurality of stack entries according to a replacement policy.

15. The system of claim 14, wherein the replacement policy is a least-recently used replacement policy.

16. The system of claim 15, further comprising:
means for storing the retrieved information in a prefetch buffer, the prefetch buffer organized using a first-in, first-out replacement policy.

17. The system of claim 16, wherein the rearranging policy makes the referenced information eligible for immediate replacement.

18. The system of claim 13, wherein the means for determining an amount of information to prefetch comprises:
means for determining an amount of information to prefetch based on the count of references corresponding to the run and on a size of the prefetch buffer.

19. The system of claim 13, wherein in the updating means comprises:
means for updating the count corresponding to a run for each reference address matching the run.

20. The system of claim 13, wherein in the updating means comprises:
means for updating the count corresponding to a run for each unique reference address matching the run.

21. A computer program product for determining information that is to be prefetched in a multi-stream environment, comprising:
a computer readable medium;
computer program instructions, recorded on the computer readable medium, executable by a processor, for performing the steps of:
receiving a reference address referencing stored information;
finding a matching run;
updating a count corresponding to the run;
determining an amount of information to prefetch, if the count exceeds a predetermined threshold; and
retrieving the determined amount of information, if a predetermined fraction of the determined amount of information to prefetch must still be retrieved.

22. The computer program product of claim 21, wherein the step of finding a matching run comprises the step of:
searching a stack comprising a plurality of entries to find an entry corresponding to the reference address.

23. The computer program product of claim 22, wherein each of the plurality of entries is associated with a maximum accessed address, a forward range, and a backward range, and the searching step comprises the steps of:
searching the plurality of stack entries in one direction starting at an end of the stack; and
determining whether the reference address is between (maximum accessed address−backward range) and (maximum accessed address+forward range) for each stack entry until a matching stack entry is found.

24. The computer program product of claim 23, further comprising the step of:
rearranging the plurality of stack entries according to a replacement policy.

25. The computer program product of claim 24, wherein the replacement policy is a least-recently used replacement policy.

26. The computer program product of claim 25, further comprising the step of:
storing the retrieved information in a prefetch buffer, the prefetch buffer organized using a first-in, first-out replacement policy.

27. The computer program product of claim 26, wherein the rearranging policy makes the referenced information eligible for immediate replacement.

28. The computer program product of claim 23, wherein the step of determining an amount of information to prefetch comprises the step of:
determining an amount of information to prefetch based on the count of references corresponding to the run and on a size of the prefetch buffer.

29. The computer program product of claim 23, wherein in the updating step comprises the step of:
updating the count corresponding to a run for each reference address matching the run.

30. The computer program product of claim 23, wherein in the updating step comprises the step of:
updating the count corresponding to a run for each unique reference address matching the run.

\* \* \* \* \*